Aug. 29, 1933.  F. LEISTER  1,924,937
ANTIFRICTION BEARING
Filed May 27, 1930
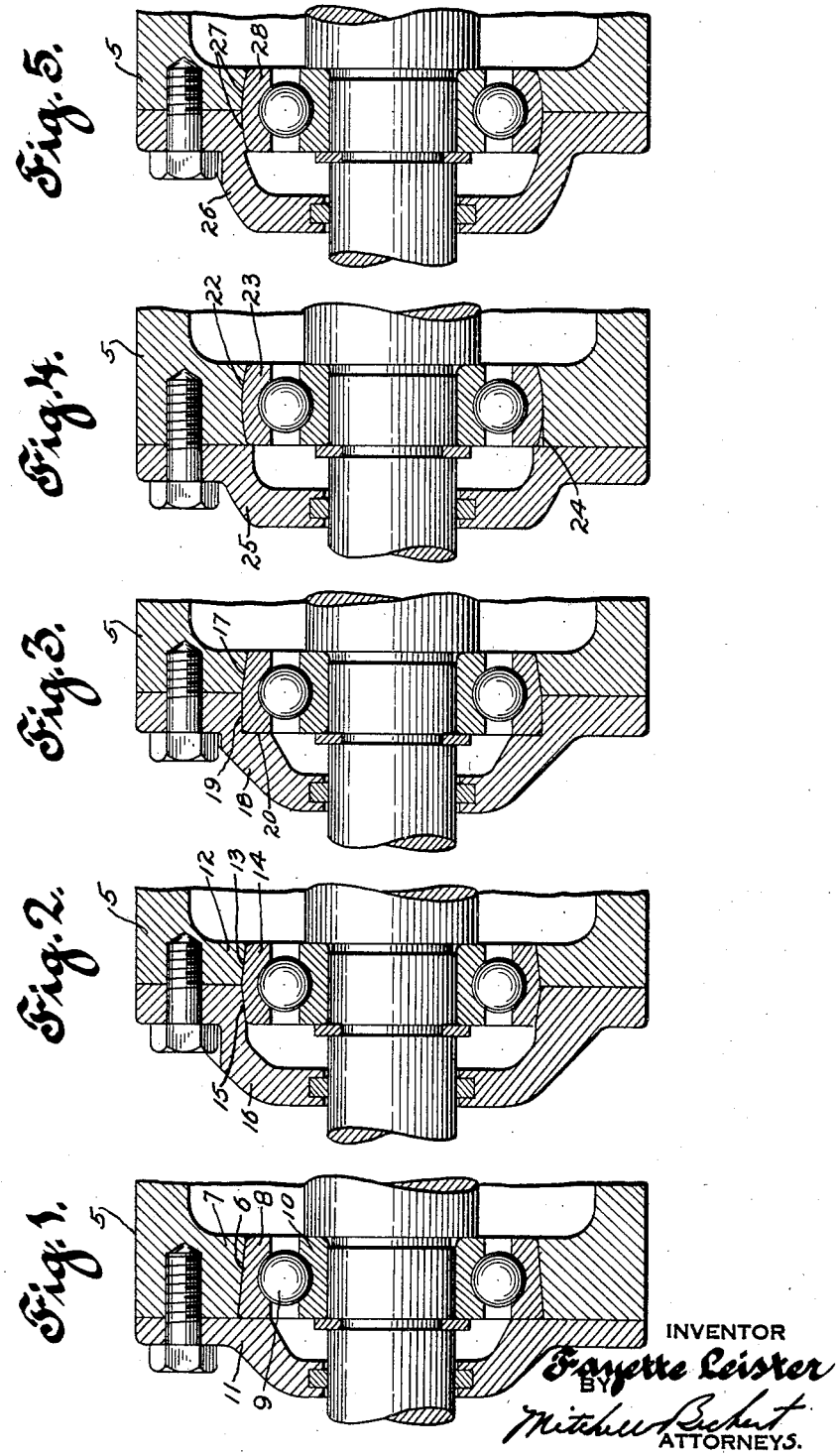

Patented Aug. 29, 1933

1,924,937

UNITED STATES PATENT OFFICE 1,924,937

ANTIFRICTION BEARING

Fayette Leister, New Britain, Conn., assignor to The Fafnir Bearing Company, New Britain, Conn., a corporation of Connecticut Application May 27, 1930. Serial No. 456,030

2 Claims. (Cl. 308—189)

My invention relates to an antifriction bearing device and more particularly to means for sustaining a bearing ring against end thrusts.

It is common practice to provide a housing member with a straight bore to receive the outer ring of an antifriction bearing. Such bore is usually shouldered so that one edge of the bearing ring abuts such shoulder and is prevented from axial movement in one direction. The opposite edge of the bearing is engaged by some member, such as a second housing member, for preventing axial movement of the bearing ring in the opposite direction. Often, the outer ring serves to pilot two housing members relatively to each other, and the two housing members when secured together sustain the bearing in place against end thrusts. A shouldered bore for receiving a bearing ordinarily requires a wall of considerable thickness in order to provide the flange or shoulder portion for sustaining the bearing as heretofore noted. In accordance with my invention, I am able to properly position an antifriction bearing axially without employing a shouldered bore, and therefore the wall in the housing or supporting member may be made relatively thinner and still adequately support the bearing. By making the wall thinner and doing away with the shouldered portion, considerable metal may be saved and the housing in general shortened.

It is the general object of the present invention to provide an improved means for sustaining an antifriction bearing against end thrusts.

It is a more specific object to provide a bearing housing or supporting member and bearing so formed as to properly position the bearing against axial movement in at least one direction without resorting to a counterbore or shoulder at the bottom of a bore.

In the drawing which shows, for illustrative purposes only, preferred forms of the invention—

Fig. 1 is an illustrative more or less conventional view of a bearing and housing illustrating one form of the invention;

Figs. 2, 3, 4 and 5 are views similar to Fig. 1, but illustrating modifications.

In said drawing, 5 indicates a bearing housing or supporting member which may be any member such as an automobile transmission casing which supports one or more antifriction bearings. As shown in Fig. 1, the housing 5 is provided with a tapered bore 6 extending from one side of the housing wall 7 to the other. 8 indicates the outer bearing ring of an antifriction bearing including antifriction bearing members such as balls 9. An inner bearing ring 10 will usually be provided. The outer surface of the outer ring 8 is tapered so as to properly fit the tapered bore 6 in the wall 7 so that the bearing ring 8 will be wedged in and held against end thrust in one direction. The ring 8 is held in the bore in any suitable manner as by means of a second housing member 11 conventionally shown as a cover cap, but which may be any member which it is desired to secure to the housing part 5. As shown, the housing member 11 abuts the edge of the larger diameter of the ring 8 and positions the same against axial movement. Thus, the bearing ring 8 is held definitely against end movement in either direction.

In that form shown in Fig. 2, the housing wall 12 is considerably thinner than the one shown in Fig. 1 and the tapered bore 13 about half the width of that shown in Fig. 1. The outer bearing ring 14 is formed with a double taper as illustrated, one taper fitting the tapered bore 13 in the housing 5. The other tapered surface on the ring 14 fits within a correspondingly tapered bore 15 in the second housing member, conveniently shown as a cover cap 16. Thus, when the outer ring 14 is in place, the two housing members 5 and 16 fitting upon the ring 14 serve to definitely hold the same in place against axial movement. It will also be noted that with the bearing ring 14 extending partly into each of the housing members 5 and 16, the bearing ring serves to pilot the housing members relatively to each other.

In that form of the invention shown in Fig. 3, only the housing member 5 is tapered as shown at 17, while the second housing member 18 is provided with a straight bore 19 and a shoulder 20 abutting one edge of the ring. Thus, the ring in Fig. 3 serves to pilot the housing members 5 and 18 relatively to each other, and the bearing ring is definitely held against axial movement in either direction.

In that form shown in Fig. 4, in general quite similar to Fig. 1, the housing member 5 is provided with a tapered bore 22 of rounded or spherical cross-section, and the outer surface of the ring 23 is formed so as to fit the bore 22. The housing 5 is provided with a notch 24 communicating with the spherical bore 22 so as to permit the ring 23 to be entered when turned at right angles to the position shown. The ring 23 will be definitely held against axial movement in either direction by the tapered bores and against oscillating movement as well as axial movement by the abutting portion of the cover plate 25.

In the form shown in Fig. 5, in general quite similar to Fig. 2, the housing members 5 and 26 are provided with tapered bores 27 of rounded or spherical cross-section, and the outer surface of the ring 28 is formed so as to fit the bores 27. The ring 28, as will be noted, serves to pilot the housing members 5 and 26 relatively to each other and the ring 28 will be definitely held against axial movement in either direction by the tapered bores. In addition, with the spherical bores 27 and corresponding outer surface on the ring 28, there may be a slight rocking movement between the outer ring and coacting parts of the housing.

In all forms of the invention herein disclosed, it will be noted that shouldered bores are not required for sustaining the bearing rings against end thrusts. Thus, a small amount of metal may be saved, wall sections made thinner and the housing portion shortened proportionately. Such small savings will amount, in the aggregate, to a considerable amount when a great many units are built.

While the invention has been described in considerable detail and several forms illustrated, it is to be understood that I do not wish to be limited to the forms shown nor to the details of construction, since changes may be made within the scope of the invention as defined in the appended claims.

I claim:

1. In a device of the character indicated, a bearing housing member having a tapered bore therein, an antifriction bearing ring having a tapered outer surface to fit said tapered bore so that said ring will be sustained in said bore against axial motion in one direction, said ring having a portion projecting axially from and beyond the housing member having said tapered bore, a second housing member having a bore therein to fit upon and be piloted by the projecting portion of said bearing ring, said second housing member being in abutting relation to said first mentioned housing member when the parts are assembled, and means for detachably securing said housing members together in abutting relation.

2. In a device of the character indicated, a bearing housing member having a tapered bore therein, an anti-friction bearing ring having a tapered outer surface to fit within said bore whereby said ring will be sustained against axial motion in said housing in one direction, said ring having a portion projecting from and beyond said housing member having said tapered bore, said projecting portion being tapered oppositely to the taper of said first mentioned tapered portion of said ring, a second housing member having a tapered bore to fit upon said projecting tapered portion of said bearing ring and to be piloted thereby, said housing members being in abutting relation to each other when said tapered portions of said bearing ring fit within said tapered bores, and means for securing said housing members together in such abutting relation.

FAYETTE LEISTER.